United States Patent Office 3,406,163
Patented Oct. 15, 1968

3,406,163
WATER-SOLUBLE MONOAZO PYRAZOLONE DYESTUFFS
Fritz Meininger and August Bauer, Frankfurt am Main, and Klaus Berner, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Apr. 26, 1965, Ser. No. 451,047
Claims priority, application Germany, May 6, 1964, F 42,809
5 Claims. (Cl. 260—162)

ABSTRACT OF THE DISCLOSURE

Water soluble dyestuffs of the formula

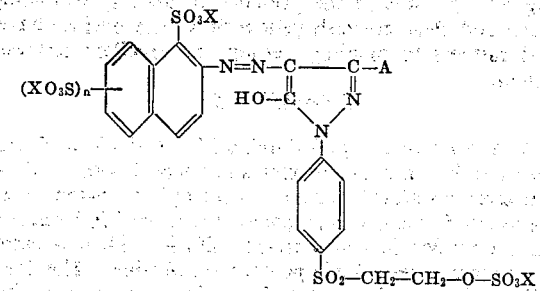

in which X is hydrogen or an alkali metal atom, $n$ is 0, 1 or 2 and A is lower alkyl, which dyestuffs produce, in the presence of alkaline substances on cellulose materials, greenish yellow tints of high color strength and of a very good fastness to light and to washing.

---

The present invention provides new water soluble monoazo-dyestuffs and a process for preparing them; it provides in particular water-soluble monoaza-dyestuffs which in the form of their free acids correspond to the formula

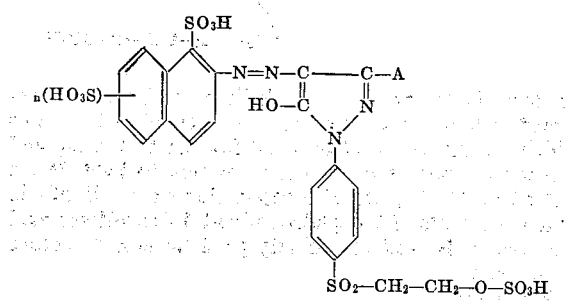

in which $n$ represents the integers 0, 1 or 2 and A is lower alkyl.

It has been found that valuable, very easily water-soluble monoazo-dyestuffs which in their free acids correspond to the formula

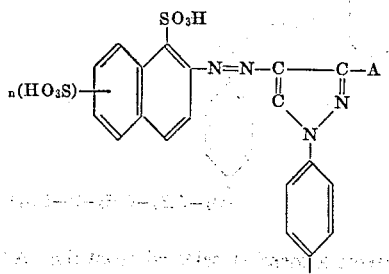

in which $n$ represents the integers 0, 1 or 2, A is lower alkyl, can be prepared by diazotising an amine of the formula

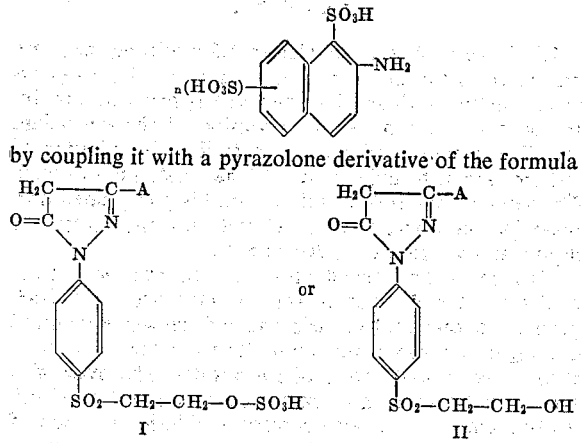

by coupling it with a pyrazolone derivative of the formula $$\begin{array}{cc} H_2C\text{-----}C\text{---}A & H_2C\text{-----}C\text{---}A \\ O=C \quad \quad N & O=C \quad \quad N \\ \diagdown N \diagup & \diagdown N \diagup \\ | & | \\ \phantom{a} & \text{or} \\ | & | \\ SO_2\text{---}CH_2\text{---}CH_2\text{---}O\text{---}SO_3H & SO_2\text{---}CH_2\text{---}CH_2\text{---}OH \\ I & II \end{array}$$

wherein $n$ and A have the meanings indicated above, and by esterifying in the known manner the hydroxyl group of the hydroxyethylsulfone radical with concentrated sulfuric acid or an agent yielding sulfur trioxide.

As diazo components the following amino compounds may be used: 2-naphthylamine-1-sulfonic acid, 2-naphthylamine-1.5-disulfonic acid, 2-naphthylamine-1.6-disulfonic acid, 2-naphthylamine-1.7-disulfonic acid and 2-naphthylamine-1.5.7-trisulfonic acid.

It is suitable to carry out the esterification by introducing the starting dyestuffs obtained by coupling the diazotised amino compounds with pyrazolones of the Formula II, into concentrated sulfuric acid and stirring at the usual temperature until completely dissolved. The conversion of the starting dyestuffs into the corresponding sulfuric acid esters may also be carried out by reacting the hydroxyl group of the hydroxyethylsulfone radical with an agent yielding sulfur trioxide, such as chlorosulfonic acid or amidosulfonic acid, in an inert organic solvent. Appropriate solvents are for example dimethylformamide, dimethylsulfoxide, quinoline, dimethylaniline, pyridine or homologues of pyridine as for example picoline.

Pyrazolones of the Formulae I and II used as coupling components can be obtained by reacting in the usual manner the corresponding derivatives of phenylhydrazine with aceto-acetic esters or diketene and if required by esterifying subsequently the hydroxyl group of the hydroxyethylsulfone radical in accordance with the esterification process described above.

The monoazo-dyestuffs obtained according to the process of the present invention, are valuable as regards the dyeing of cellulose textiles, for example cotton, linen and viscose rayon. They may be used according to technically common dyeing and printing processes for reactive dyestuffs and they produce in the presence of agents having an alkaline reaction on cellulose materials greenish yellow tints of very good fastness to light and washing.

The special value of the new dyestuffs resides in the fact, that in the dyeing of native and regenerated cellulose fibers particularly from long baths, the dyeing baths are exhausted very well and that dyeings and prints of a good depth of color are obtained, which are distinguished by evenness of shade and very good fastness properties, particularly by excellent fastness to light.

As regards building up and color strength of cotton dyeings as well as light fastness, the monoazo-dyestuffs obtained according to the process of the present invention are far superior to the monoazo-dyestuffs disclosed in U.S. Patent 2,728,762 and most comparable to the above-mentioned dyestuffs.

The following examples serve to illustrate the invention but they are not intended to limit it thereto, the parts being by weight unless otherwise stated and the relationship of parts by weight to parts by volume being that of the kilogram to the litre:

EXAMPLE 1

151.5 parts of 2-naphthylamine 1.5-disulfonic acid are diazotised in the usual manner. 141 parts of 1-(4'-β-hydroxyethylsulfonylphenyl)-3-methyl-5-pyrazolone are introduced into the aqueous suspension of the diazonium salt. The coupling mixture is neutralised by addition of sodium carbonate and stirred until the dyestuff has formed. The yellow monoazo-dyestuff obtained is precipitated with potassium chloride, filtered off and pulverised after the drying at temperatures of 70° to 80° C.

To convert the dyestuff thus obtained into the sulfuric acid ester, the dyestuff powder is introduced into 2000 parts of concentrated sulfuric acid and the whole is stirred overnight at room temperature. The reaction mixture is then added to 4000 parts of ice powder. The dyestuff is salted out by addition of potassium chloride, filtered off, washed until neutral with potassium chloride solution of 20% of weight and dried at temperatures of 50° to 60° C. in a vacuum drier. 453 parts of a yellow powder, which dissolves in water producing a yellow color, are obtained.

In the form of its free acid, the dyestuff corresponds to the following formula:

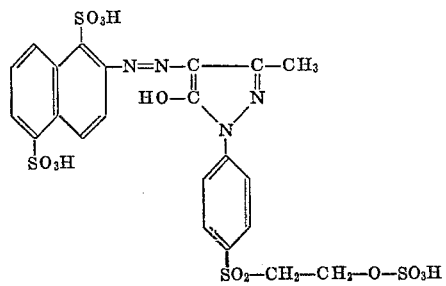

In the presence of alkalis the dyestuff produces in salt-containing dyeing baths on native and regenerated cellulose fibers full, clear, greenish yellow dyeings exhibiting very good fastness to wetting and light.

EXAMPLE 2

59.6 parts of the dyestuff powder obtained according to Example 1, paragraph 1, are mixed at temperatures of 85° to 90° C. with 250 parts of dry pyridine. Subsequently 7.4 parts of urea and 42 parts of amidosulfonic acid are added and heated for 30 minutes to 100° to 105° C. The mixture is then introduced into 2500 parts of water and the dyestuff is isolated by salting out with potassium chloride. The dyestuff which has precipitated is filtered off and the filtration residue is washed with potassium chloride of 25% of weight.

The product obtained corresponds to the dyetuff obtained by means of esterification in concentrated sulfuric acid as described in Example 1.

EXAMPLE 3

141 parts of 1-(4'-β-hydroxyethylsulfonylphenyl)-3-methyl-5-pyrazolone are introduced at temperatures of 25° to 30° C. into 350 parts of sulfuric acid of 96% of weight and the whole is stirred at room temperature until dissolved completely. Subsequently ice is added and the solution is neutralised by addition of solid sodium carbonate.

151.5 parts of 2-naphthylamine-1.5-disulfonic acid are diazotised as usual. To the thus obtained suspension of the diazonium salt the above-mentioned solution of the sulfuric acid ester of 1-(4'-β-hydroxyethylsulfonylphenyl) 3-methyl-5-pyrazolone is added. By further adding sodium carbonate the coupling is completed in a weakly acid to neutral medium. The dyestuff isolated by salting out with potassium chloride is identical with the dyestuff obtained according to Example 1.

EXAMPLE 4

111.5 parts of 2-naphthylamine-1-sulfonic acid are diazotised in the usual manner and coupled with 141 parts of 1-(4'-β-hydroxyethylsulfonylphenyl)-3-methyl-5-pyrazolone according to the process described in Example 1. When the coupling is completed the dyestuff which has formed is separated by means of potassium chloride, isolated by filtration, subsequently dried and pulverised. The product obtained is then esterified according to the process described in Example 1. 400 parts of a yellow powder are obtained, which dissolves in water producing a yellow color.

Native and regenerated cellulose fibers are dyed in long dyeing baths in the presence of alkalis, exhibiting strong and clear greenish yellow tints. The dyeings have good fastness to rubbing, wetting and excellent fastness to light.

EXAMPLE 5

151.5 parts of 2-naphthylamine-1.7-disulfonic acid are diazotised in the usual manner and coupled with 1-(4'-β-hydroxyethylsulfonylphenyl) - 3 - methyl - 5 - pyrazolone. The dyestuff obtained is prepared as described in Example 1 and esterified in concentrated sulfuric acid. 470 parts of a yellow water-soluble powder are obtained. The dyestuff which in the form of its free acid corresponds to the following formula

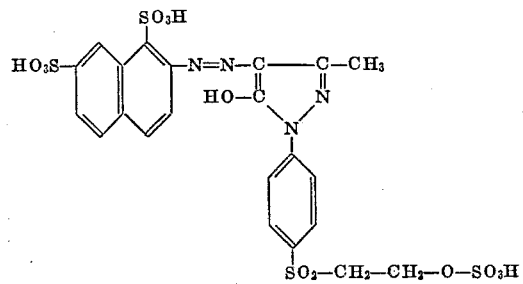

produces in the presence of alkalis on native and regenerated cellulose fibers strong, clear greenish yellow tints which are distinguished by good fastness to wetting and rubbing as well as by excellent fastness to light. When instead of 151.5 parts of 2-naphthylamine-1.7-disulfonic acid 191.5 parts of 2-naphthylamine-1.5.7-trisulfonic acid are used, a dyestuff of similarly good fastness properties is obtained.

We claim:
1. The water-soluble monoazo dyestuffs of the formula

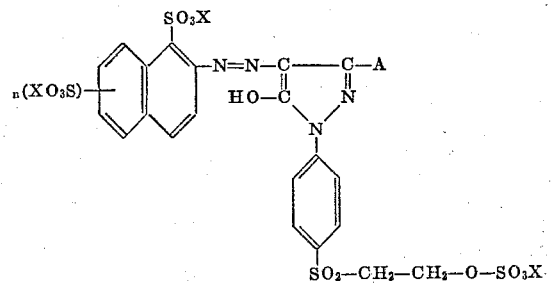

in which X represents a member selected from the group consisting of hydrogen and an alkali metal atom, $n$ stands for one of the numbers 0, 1 and 2 and A represents lower alkyl.

2. The water-soluble monoazo dyestuff of the formula
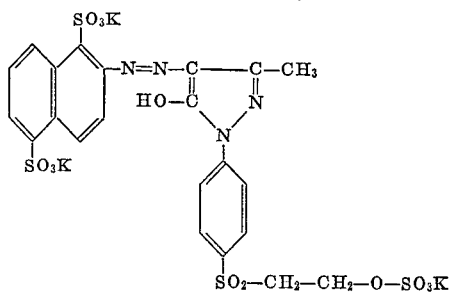
3. The water-soluble monoazo dyestuff of the formula
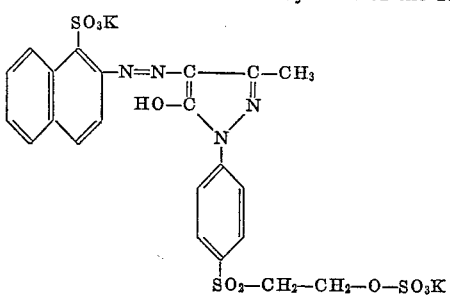
4. The water-soluble monoazo dyestuff of the formula
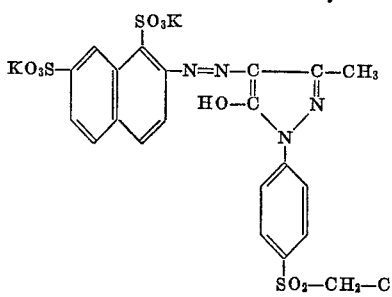
5. The water-soluble monoazo dyestuff of the formula
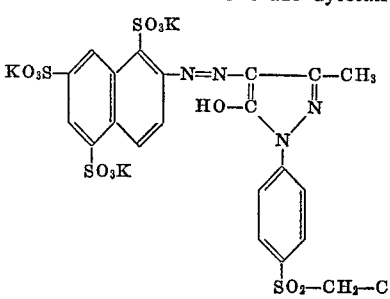
References Cited
UNITED STATES PATENTS
2,728,762  12/1955  Heyna et al. _____ 260—163
3,152,114  10/1964  Siegel et al. _____ 260—162 X
CHARLES B. PARKER, *Primary Examiner.*
D. M. PAPUGA, *Assistant Examiner.*